United States Patent
Agrawal et al.

(10) Patent No.: US 11,212,221 B1
(45) Date of Patent: Dec. 28, 2021

(54) METHODS TO IMPROVE ECMP FOR BGP SERVICES AND BGP FOR PROVIDER EDGES WITH HYBRID LABEL DISTRIBUTION

(71) Applicant: Cisco Technology, Inc., San Jose, CA (US)

(72) Inventors: Swadesh Agrawal, San Jose, CA (US); Dhananjaya Rao, Sunnyvale, CA (US); Bertrand Duvivier, Wepion (BE); Sameer R. Gulrajani, Fremont, CA (US); Yuri Tsier, Ontario (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/891,194

(22) Filed: Jun. 3, 2020

(51) Int. Cl.
*H04L 12/723* (2013.01)
*H04L 12/46* (2006.01)
*H04L 12/703* (2013.01)
*H04L 12/707* (2013.01)

(52) U.S. Cl.
CPC .......... *H04L 45/50* (2013.01); *H04L 12/4641* (2013.01); *H04L 45/22* (2013.01); *H04L 45/28* (2013.01)

(58) Field of Classification Search
CPC ......... H04L 45/50; H04L 45/28; H04L 45/22; H04L 12/4641
See application file for complete search history.

(56) References Cited

U.S. PATENT DOCUMENTS

| | | | |
|---|---|---|---|
| 9,729,432 B2 | 8/2017 | Shearman et al. | |
| 10,003,531 B2 | 6/2018 | Zhou | |
| 10,193,801 B2 | 1/2019 | Minei et al. | |
| 10,250,552 B1 | 4/2019 | Sajassi | |
| 10,469,372 B2 | 11/2019 | Filsfils et al. | |
| 2013/0223228 A1* | 8/2013 | Mohapatra | H04L 45/50 370/237 |
| 2016/0119229 A1* | 4/2016 | Zhou | H04L 12/4641 370/392 |
| 2016/0134481 A1* | 5/2016 | Akiya | H04L 41/5038 709/224 |

* cited by examiner

*Primary Examiner* — Jianye Wu
(74) *Attorney, Agent, or Firm* — Edell, Shapiro & Finnan, LLC (57) ABSTRACT

First and second egress nodes are each multi-homed to a customer edge (CE) that participates in virtual routing and forwarding (VRF). First forwarding information is configured on the first egress node. The first information includes VRF labels and defines forwarding of traffic based on the VRF labels and a status of a primary path to the CE. The VRF labels include a per-VRF label for the VRF and a per-CE label for the CE. Second forwarding information is configured on the second egress node. The second forwarding information includes the per-VRF label and the per-CE label, and defines traffic forwarding based on the VRF labels. Upon receiving traffic for the CE that carries the per-VRF label, the first egress node determines the status of the primary path, and forwards the traffic to either the CE over the primary path or to the second egress node, depending on the status.

20 Claims, 9 Drawing Sheets

METHODS TO IMPROVE ECMP FOR BGP SERVICES AND BGP FOR PROVIDER EDGES WITH HYBRID LABEL DISTRIBUTION

TECHNICAL FIELD

The present disclosure relates to multi-homed provider edge nodes that support Virtual Routing and Forwarding (VRF) with equal-cost multipath routing (ECMP).

BACKGROUND

A core network includes provider edge (PE) nodes to forward traffic to customer edge (CE) nodes connected to the core network. The PE nodes may be multi-homed to the CE nodes, and may implement equal-cost multipath routing (ECMP) in combination with multi-homed forwarding. When the CE nodes participate in Virtual Forwarding and Routing (VRF) for Virtual Private Networks (VPNs), the PE nodes allocate VRF VPN labels for the VRFs, and use the VRF VPN labels to forward VRF traffic to appropriate CE nodes. Conventional use of VRF VPN labels disadvantageously constrains network topologies, especially in the context of ECMP with multi-home forwarding, and does not work well for general Layer-3 (L3) VPN (L3VPN) enterprise service that uses many arbitrarily multi-homed PE nodes.

Also, conventional allocation of VRF VPN labels for VPNs to support ECMP scenarios and multi-homing disadvantageously consumes limited storage space on PE hardware for ECMP Forwarding Equivalency Class (FEC) entries, which typically each specify next hop identifiers and outgoing VRF VPN labels. This further constrains the network topologies directed to ECMP combined with multi-homed VRFs.

DESCRIPTION OF EXAMPLE EMBODIMENTS

Overview

In an embodiment, a method is performed at a first egress node and a second egress node each multi-homed to a customer edge (CE) that participates in virtual routing and forwarding (VRF). The first egress node has a primary path to the customer edge that is preferred over any other path to the customer edge. The method includes configuring first forwarding information on the first egress node. The first information includes VRF labels and defines forwarding of traffic based on the VRF labels and a status of the primary path to the customer edge. The VRF labels include a per-VRF label for the VRF and a per-CE label for the customer edge. The method also include configuring second forwarding information on the second egress node. The second forwarding information includes the per-VRF label and the per-CE label, and defines forwarding of traffic based on the VRF labels. The method further includes, at the first egress node, upon receiving traffic for the customer edge that carries the per-VRF label: determining the status of the primary path; and forwarding the traffic to either the customer edge over the primary path or to the second egress node, depending on the status.

In another embodiment a method is performed by egress nodes and an ingress node. The egress nodes are each multi-homed to a first customer edge (CE) and a second customer edge associated with first virtual routing and forwarding (VRF) and second VRF, respectively. The ingress node is configured to forward traffic for the second VRF to each of the egress nodes over respective equal-cost multi-path (ECMP) routing paths, and to forward traffic for the first VRF to one of the egress nodes. The method includes configuring, on each of the egress nodes, a first label and a second label for the first VRF and the second VRF, respectively. The method further comprises, at each of the egress nodes, advertising control plane information including a first prefix and a second prefix for the first customer edge and the second customer edge, respectively, the first label, the second label, and a distinct next hop addresses for each of the egress nodes. The method further includes, at the ingress node, upon receiving the control plane information, mapping the first prefix, the second prefix, the first label and the second label to a single entry in an ECMP table that lists the distinct next hop addresses for traffic carrying the first label and traffic carrying the second label.

EXAMPLE EMBODIMENTS

Figure 1:
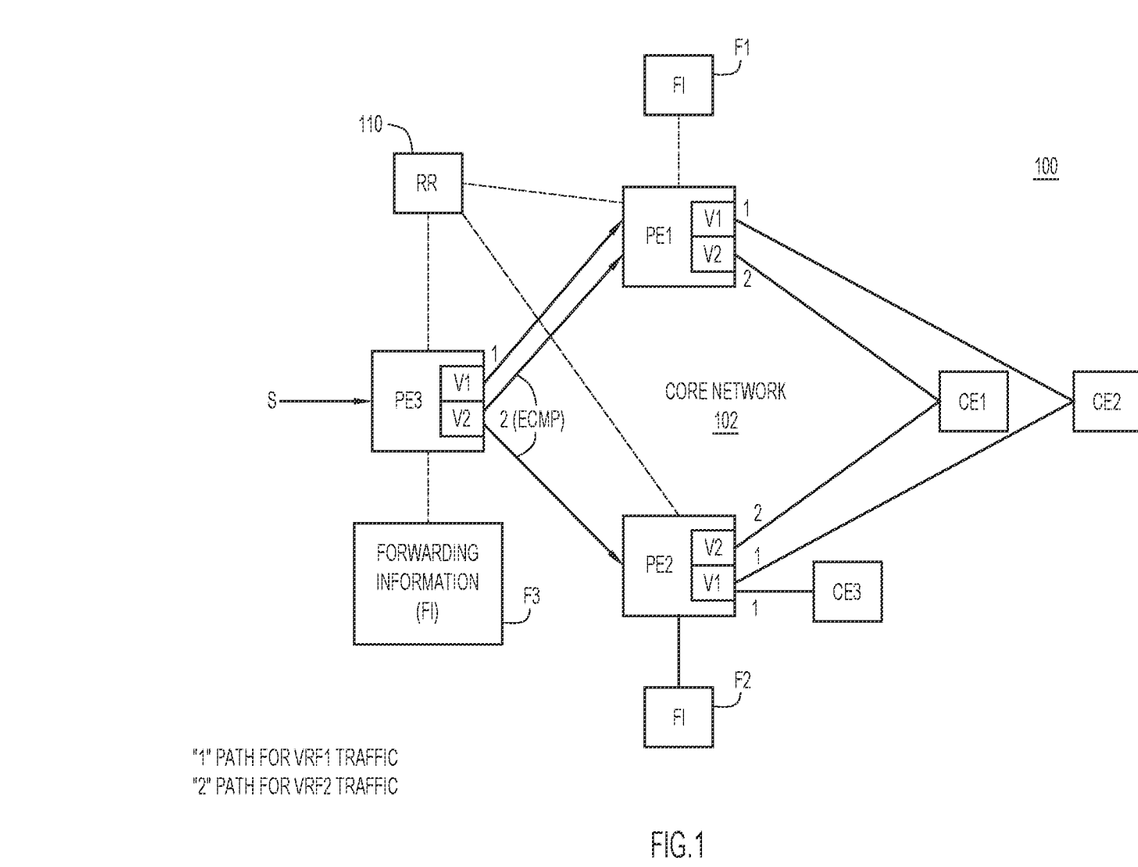
FIG. 1 is a block diagram of a network environment, including a core network of provider edge (PE) nodes connected to customer edge (CE) nodes, in which embodiments presented herein may be implemented.

With reference to FIG. 1, there is a block diagram of an example network environment 100 in which embodiments presented herein may be implemented. Network environment 100 includes a core network 102 to forward traffic between a source S connected to the core network and customer edge (CE) nodes CE1, CE2, and CE3 each connected to the core network. The traffic includes data packets and messages and may be forwarded using network communication protocols such as the Transmission Control Protocol/Internet Protocol (TCP/IP), User Datagram Protocol (UDP), and the like. Core network 100 includes provider edge (PE) nodes or devices, including an egress node PE1, an egress node PE2, and an ingress node PE3 configured to communicate with each over paths or links interconnecting the nodes. Customer edge nodes CE1, CE2, and CE3 and provider edge nodes PE1-PE3 may each include a network device, such as a router or switch, and may be hardware devices, or virtual devices (e.g., applications hosted on a server). While only a small number of network nodes are shown, thousands may actually be present in a typical network. In the ensuing description, customer edge nodes CE1, CE2, and CE3 may be referred simply as "CE1," "CE2," and "CE3," respectively, and provider edge nodes PE1, PE2, and PE3 may be referred to simply as "PE1," "PE2," and "PE3."

PE1 and PE2 are dual-homed to CE1, and are also dual-homed to CE2. CE1, CE2 participate in or belong to Virtual Private Networks (VPNs) VPN2, VPN1 associated with Virtual Routing and Forwarding (VRF) instances VRF2, VRF1, respectively. A "VRF instance" is also generally referred to generally as a "VRF." PE1-PE3 support forwarding of traffic from source S to CE1 and CE2 based in part on VRF VPN labels for VRF2 and VRF1 carried in the traffic. In an example in which CE3 also participates in VRF1, PE1-PE3 support forwarding of traffic carrying the VRF VPN label for VRF1 to CE3. To this end, PE1, PE2, and PE3 are each configured with VRF instances for VRF1 and VRF2 (denoted "V1" and "V2"). VRF instances V1, V2 at PE1, PE2, and PE3 use respective first traffic forwarding information F1, second traffic forwarding information F2, and third traffic forwarding information F3 that define forwarding of traffic (i.e., traffic forwarding) for both VRF1 and VRF2 at the PEs under various conditions and based on the VRF VPN labels in the traffic. The content associated with each of traffic forwarding information F1, F2, and F3 varies depending on the embodiment, described below.

CE1, CE2, and CE3 and PE1-PE3 may participate in Border Gateway Protocol (BGP) sessions, such as through a route reflector (RR) 110. Thus, traffic forwarding information (also referred to simply as "forwarding information") F1-F3 may be learned, in part, through message exchanges between CE1 (and CE3) and CE2 and PE1-PE3, and RR 110, during the BGP sessions. Forwarding information F1-F3 may also be configured on PE1-PE3, in part, by an administrator. By way of example, forwarding information F1-F3 may include Internet Protocol (IP) prefixes for CE1 and CE2, information for next hops (e.g., for PE1 and PE2) leading to CE1 and CE2, various VRF VPN labels (e.g., for VRF1 and VRF2), and traffic forwarding actions to be taken based on (i) VRF VPN labels carried in traffic, and (ii) monitored statuses of paths over which traffic may be forwarded to CE1, CE2. RR 110, the BGP sessions, and related messages, such as BGP advertisements, and the like, collectively represent a control plane (e.g., a BGP control plane) that generates and disseminates control plane information for use by PE1-PE3, as described herein.

Embodiments presented herein use per-VRF allocation to allocate VRF VPN labels to dual-homed egress nodes PE1 and PE2, for example. Per-VRF allocation means that the same VRF VPN label for a particular VRF (e.g., VRF1 or VRF2) is configured on both PE1 and PE2 in respective forwarding information F1 and F2. In other words, for a particular VRF, both PE1 and PE2 use the same VRF VPN label, which is referred to as a "per-VRF VPN label" (for brevity, also referred to as a "per-VRF label"). In the example of FIG. 1, PE1 and PE2 are each configured with a per-VRF label for VRF1 and a per-VRF label for VRF2.

Other embodiments presented herein configure per-CE VRF labels (referred to simply as "per-CE" labels) on PE1 and PE2, as will be described below.

Generally, forwarding of traffic in network environment 100 proceeds as follows. Ingress node PE3 receives, from source S, traffic destined for CE1 (and CE3) and CE2 carrying VRF labels VRF1 and VRF2, respectively. Ingress node PE3 forwards the traffic to egress nodes PE1 and/or PE2 as directed by forwarding information F3 and the VRF labels carried in the traffic. In turn, egress nodes PE2 and PE3 forward the traffic for VRFs VRF2 and VRF1 to CE1 or CE2 as directed by forwarding information F2 and F3, respectively, responsive to (i) the VRF labels carried in the traffic, and (ii) the statuses of paths leading from PE1 and PE2 to CE1 and CE2. In the example of FIG. 1, forwarding information F3 configured on PE3 also defines equal-cost multi-path routing (ECMP) paths from PE3 to PE1 and PE2 for VRF2, in which case PE3 forwards traffic for the VRF to both PE1 and PE2 over the ECMP paths.

Figure 2:
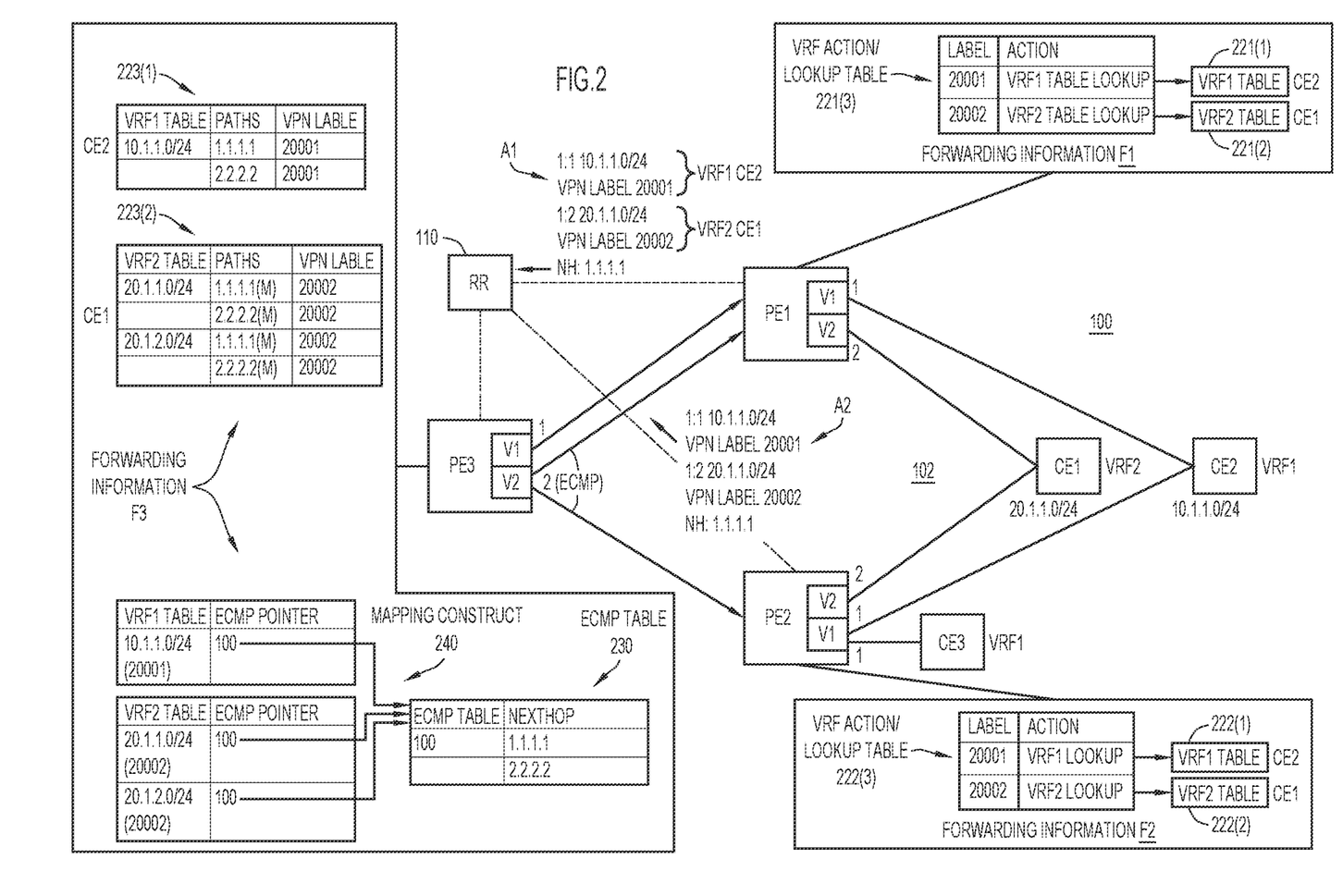
FIG. 2 is an illustration of traffic forwarding information and an efficient ECMP FEC entry configured on the PE nodes, according to an example embodiment.

With reference to FIG. 2 there is an illustration of forwarding information F1-F3, generally, and an efficient configuration for ECMP Forwarding Equivalency Class (FEC) entries stored on PE3, according to embodiments presented herein. Forwarding information F1 on PE1 includes a VRF1 lookup table 221(1) for VRF1, a VRF2 lookup table 221(2) for VRF2, and a VRF action table 221(3) (also referred to as a "VRF index/lookup table") configured with per-VRF labels linked to the VRF tables. For brevity, in the ensuing description and figures, a given "VRFx lookup table" is referred to simply as a "VRFx table." For example, "VRF1 lookup table 221(1)" and "VRF2 lookup table 221(2)" are referred to as "VRF1 table 221(1)" and "VRF2 table 221(2)," respectively. Also, in FIG. 2, the term "VPN" referenced in the aforementioned tables is considered synonymous with the term "VRF." The tables may be constructed in the following manner. Using BGP, for example, PE1 learns dual home prefixes from/for CE1 (e.g., prefix 20.1.1.0/24) in VRF2 and from CE2 (e.g., prefix 10.1.1.0/24) in VRF1. PE1 populates VRF1 table 221(1) and VRF2 table 221(2) with the learned information (not specifically shown in FIG. 2).

In addition, PE1 allocates respective per-VRF labels for VRF1 and VRF2. PE1 configures VRF action table 221(3) with per-VRFs labels and actions associated with the per-VRF labels. Generally, VRF action table 221(3) directs PE1 to perform actions with respect to traffic received at the PE based on the per-VRF label carried in the traffic. For example, PE1 configures a first entry of VRF action table 221(3) with a per-VRF label (e.g., 20001) for VRF1 (referred to as a "per-VRF1 label" or simply a "VRF1 label"), and a first action associated with the VRF1 label directing PE1 to perform a "VRF1 table lookup" responsive to traffic carrying the per-VRF1 label. Similarly, PE1 configures a second entry with a per-VRF label (e.g., 20002) for VRF2 (referred to as a "per-VRF2 label" or simply a "VRF2 label"), and an action directing PE1 to perform a "VRF2 table lookup" responsive to traffic carrying the per-VRF2 label.

Forwarding information F2 on PE2 includes a VRF1 lookup table 222(1) (i.e., "VRF1 table 222(1)") for VRF1, a VRF2 lookup table 222(2) (i.e., "VRF2 table 222(2)") for VRF2, and a VRF action table 222(3) configured with per-VRF labels linked to the VRF tables. The aforementioned tables may be constructed in the substantially the same manner as described above for forwarding information F2. Also, the tables for PE2 may include substantially the same information as those for PE1 due to the dual homing of PE1 and PE2 each to CE1 and CE2.

PE1 advertises control plane information to RR 110. For example, PE1 sends to RR 110 a BGP advertisement A1 that advertises some of forwarding information F1 configured on PE1, including the per-VRF labels (referenced as "VPN" labels in FIG. 3), the prefixes for the CEs associated with the per-VRF labels, and a next hop identifier (referred to simply as "next hop") for PE1. For example, advertisement A1 includes: (i) prefix 10.1.1.0/24 for CE2 in VRF1, and per-VRF1 label 20001; (ii) prefix 20.1.1.0/24 for CE1 in VRF2, and per-VRF2 label 20002; and (iii) next hop (NH) 1.1.1.1 for PE1.

Similarly, PE2 also sends to RR 110 a BGP advertisement A2 that advertises some of forwarding traffic F2 that is configured on PE2, including the per-VRF labels, the prefixes for the CEs associated with the per-VRF labels, and the next hop for PE2. In the example of FIG. 2, advertisement A2 is essentially the same as advertisement A1, except for inclusion of next hop 2.2.2.2 for PE2 instead of next hop 1.1.1.1 for PE1.

Forwarding information F3 on PE3 includes a VRF1 lookup table 223(1) (i.e., "VRF1 table 223(1)"), a VRF2 table 223(2) (i.e., "VRF2 table 223(2)"), an ECMP table 230, and an ECMP mapping construct 240. The aforementioned tables on PE3 may be constructed from control plane information received from RR 110, e.g., information conveyed to the RR by PE1 and PE2 in control plane advertisements A1, A2. VRF1 table 223(1) defines non-ECMP paths for VRF1 (20001) leading to CE2. The table includes a first entry to define a primary (P) path to prefix 10.1.1.0/24 (CE2) via next hop 1.1.1.1 (PE1) for per-VRF1 label 20001, and a second (backup path) entry to define a backup path to the same prefix via next hop 2.2.2.2 (PE2) for the per-VRF1 label.

VRF2 table 223(2) defines in part VRF2 ECMP paths leading to CE1. The table includes (i) a first pair of ECMP entries that define primary and secondary paths to prefix 20.1.1.0/24 (CE1) via next hops 1.1.1.1 (PE1) and 2.2.2.2 (PE2) for per-VRF2 label 20002, and (ii) a second pair of ECMP entries that include the same path information as the first pair.

In an example, ECMP table 230 and ECMP mapping construct 240 are configured on PE3 in hardware, e.g., in an Application Specific Integrated Circuit (ASIC), which has limited space for the ECMP table and mapping construct. The entries of ECMP table 230 may include ECMP FEC entries, for example. Given the limitation on space availability in the hardware, ECMP mapping construct 240 maps or links the forwarding information/paths presented in VRF1 table 223(1) and the VRF2 ECMP paths presented in VRF2 table 223(2) down to a single reduced-memory ECMP FEC entry in ECMP table 230, as shown in FIG. 2.

Specifically, construct 240 associates an ECMP index or pointer (e.g., 100) with each of: CE2 prefix 10.1.1.0/24 for per-VRF1 label 20001 (taken from VRF1 table 223(1) (non-ECMP path)); CE1 prefix 20.1.1.0/24 for per-VRF2 label 20002 (taken from VRF2 table 223(2) (ECMP first path)); and CE1 prefix 20.1.1.0/24 for per-VRF2 label 20002 (taken from VRF2 table 223(2) (ECMP second path)). In this way, the ECMP index (e.g., 100) indexes only a single ECMP FEC entry for the combination of both multi-homed prefixes. The single ECMP FEC entry lists two next hops, including the next hop for PE1 (1.1.1.1) and the next hop for PE2 (2.2.2.2).

More generally, ECMP mapping construct 240 maps (i) multi-homed first prefix (CE2), (ii) multi-home second prefix (CE1), (iii) a per-VRF1 label associated with the first prefix, and (iv) a per-VRF2 label associated with the second prefix to a single ECMP FEC entry that lists distinct next hop addresses for traffic carrying the per-VRF1 label and the per-VRF2 label. All prefixes across VRFs learned from the same set of next hops consume only a single ECMP FEC entry in hardware.

Figure 3:
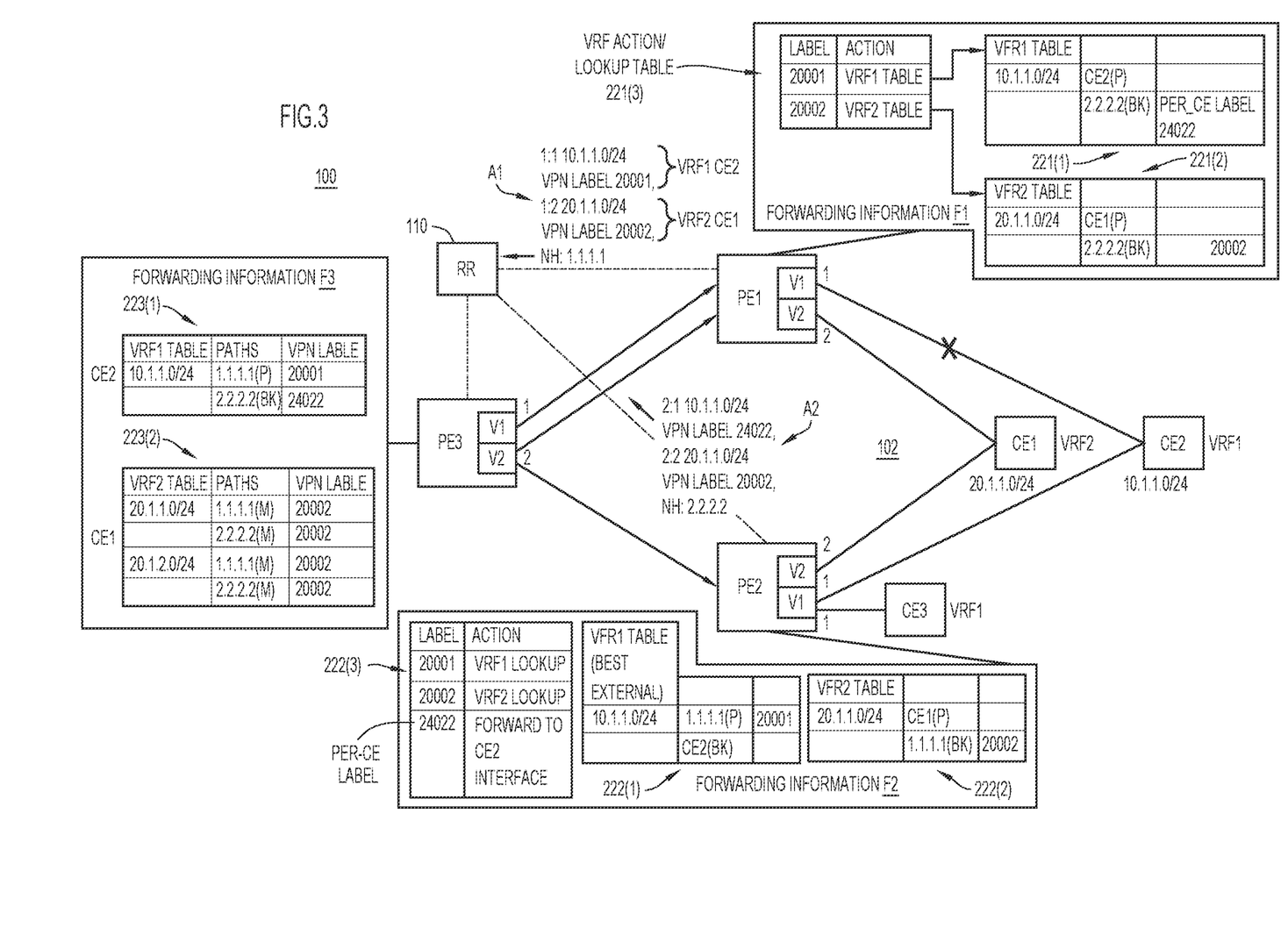
FIG. 3 is an illustration of the traffic forwarding information configured with hybrid VRF VPN labels to support Border Gateway Protocol (BGP) best external or "active-backup" operation, according to an example embodiment.

With reference to FIG. 3, there is an illustration of core network 102 with forwarding information F1 and F2 on PE1 and PE2 configured to support BGP best external or "active-backup" operation, according an embodiment. For best external operation, forwarding information F1 and forwarding information F2 use hybrid VRF labels. Hybrid VRF labels include both a per-VRF label and a per-CE VRF label (simply referred to as a "per-CE label"). Use of hybrid VRF labels (instead of only per-VRF labels) supports best external operation, and avoids an undesired forwarding loop between PEs that might otherwise result from a path failure.

An example of a path failure that can cause a forwarding loop between PEs in the absence of hybrid VRF labels is now described briefly. The example assumes that path PE1-CE2 is considered a best or cheapest cost path to CE2 for VRF1 traffic (i.e., traffic carrying the per-VRF1 label) that is preferred over all other paths, i.e., it is a primary (P) path. Thus, for forwarding of VRF1 traffic in a steady-state, i.e., while primary path PE1-CE2 is operating normally and has not failed, PE1 forwards VRF1 traffic to CE2 over the primary path. That is, in the steady-state, VRF1 traffic exits through PE1 to CE2 over primary path PE1-CE2. Also, any traffic received from CE3 on PE2, and that is destined for CE2, should be forwarded from PE2 to PE1 and, once received at PE1, should then exit from PE1 to CE2 over primary path PE1-CE2, in the steady-state.

When primary path PE1-CE2 fails (as indicated by the "X" intersecting the preferred path in FIG. 3), VRF1 traffic should be rerouted so as to exit through alternative path PE2-CE2, quickly, i.e., with minimum delay, instead of being forwarded to the failed primary path. Thus, the prefix for CE2 (e.g., 10.1.1.0/24) on PE2 is configured on PE1 as the next hop in VRF1 table 221(1). In response to the failure of the primary path PE1-CE2, and before BGP converges, PE1 reroutes traffic to PE2 with the per-VRF1 label (20001). At this time, PE2 is not yet aware that the primary path PE1-CE2 has failed, and a VRF1 lookup at PE2 forwards the traffic back to PE1 (in the absence of per-CE labels, described below). Upon receiving the traffic from PE2, PE1 returns the traffic to PE2, thus creating an undesired forwarding loop between PE1 and PE2. The undesired forwarding loop impedes a fast recovery from path failure.

The use of hybrid VRF labels shown in FIG. 3 to achieve best external option without the undesired forwarding loop is now described. Referring to forwarding information F1 on PE1, VRF action table 222(1) is configured with the same entries as in FIG. 2, and will not be described again; however, VRF1 table 221(1) includes hybrid VRF labels. Specifically, VRF1 table 221(1) includes a first entry to define a primary path to CE2 (denoted "CE2(P),") for traffic carrying the per-VRF1 label (20001). When the first entry is accessed by PE1 responsive to VRF1 traffic, the tag "CE2 (P)" causes PE1 to direct per-VRF1 traffic to an interface of the PE that is connected to CE2, directly. VRF1 table 221(1) also includes a second entry that defines (i) a backup (Bk) path to CE2 via next hop PE2 (2.2.2.2), and (ii) a per-CE label (e.g., 24022) associated with the backup path. The per-CE label is a dynamic VRF label that will be used for best external operation when primary path PE1-CE2 fails, as described below.

Referring to forwarding information F2 on PE2, VRF lookup table 222(1) includes entries similar to those in FIG. 2, except the VRF lookup table includes a third or bottom entry. The third entry includes the per-CE label (e.g., 24022) also used in VRF lookup table 221(1), and an associated action to "forward to CE2 interface," which causes PE2 to forward traffic carrying the per-CE label (24022) directly to CE2 over path PE2-CE2. The term "directly" means without forwarding back to core network 102, e.g., to any other PE. Additionally, referring to forwarding information F3 on PE3, the second/backup path entry of VRF1 table 223(1) is also configured with next hop PE2 (2.2.2.2) and the per-CE label (24022).

In operation, PE1 monitors a status of primary path PE1-CE2 for forwarding of VRF1 traffic. In steady-state, when the status is normal and the primary path has not failed, PE1 forwards VRF1 traffic (e.g., traffic carrying per-VRF label 20001) to CE2 over the primary path as directed by the first entry of VRF1 table 221(1). When PE2 detects a change in status to fail, indicating that the primary path has failed, PE1 accesses the second/backup path entry of VRF1 table 221(1), and retrieves the per-CE label (e.g., 24022) from that path entry. Based on the forwarding information in the second/backup path entry, PE1 adds the per-CE label (e.g., 24022) to the VRF1 traffic, e.g., inserts the per-CE label into the traffic, and then forwards the traffic to PE2, which is identified as next hop 2.2.2.2 in the backup path forwarding information.

PE2 receives the traffic with the added per-CE label. PE3 uses the per-CE label (24022) in the traffic as an index into the third entry of VRF index table 222(3), and access the action associated with the per-CE label. The action directs PE2 to forward the traffic to CE2 directly, without forwarding the traffic to PE1. Thus, PE2 forwards the traffic directly to CE2, and not toward the primary path, even though PE2 may be unaware that the preferred path has failed. This avoids the undesired forwarding loop described above.

Thus, the hybrid VRF labels support successful best external operation using a per-CE label and a per-VRF label. When the preferred PE1-CE2 path fails, traffic for VRF1 is tagged with the per-CE label and sent to PE2. Upon receiving the traffic, PE2 forwards the traffic to CE2 directly according to the per-CE label carried in the traffic.

Figure 4:
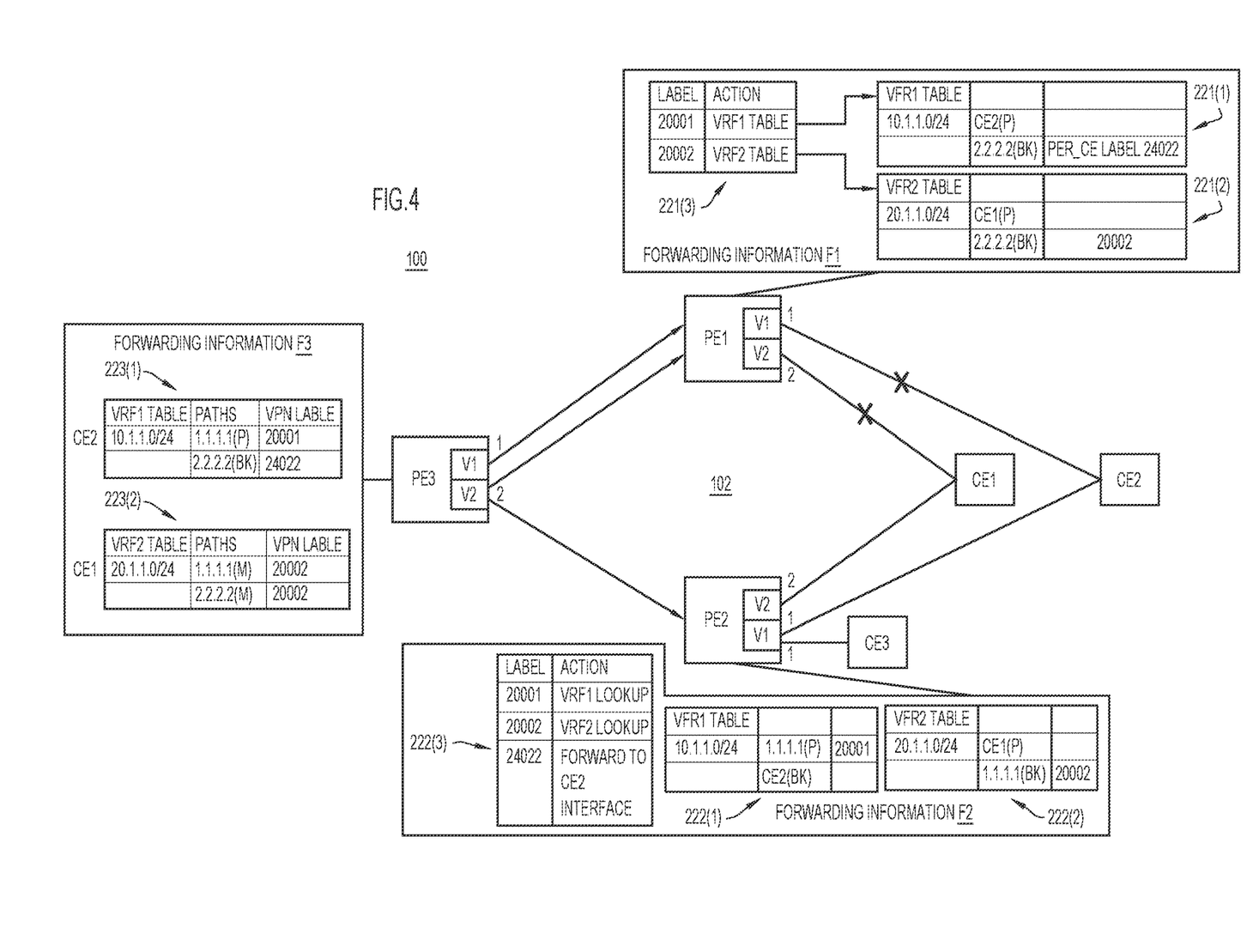
FIG. 4 is an illustration of the traffic forwarding information configured with the hybrid VRF VPN labels, to achieve best external operation with ECMP, according to an example embodiment.

With reference to FIG. 4, there is an illustration of core network 100 configured with the hybrid VRF labels shown in FIG. 3, to achieve best external operation for VRF1 and best external operation with ECMP for VRF2. As shown in FIG. 4, the primary path PE1-CE2 for VRF1 and the path PE1-CE1 for VRF2 have both failed. PE1 detects the fail status of both paths. Core network 100 implements best external for VRF1 traffic arriving at PE1 in the manner described above in connection with FIG. 3.

Upon receiving VRF2 traffic carrying the per-VRF label (20002) for VRF2, and due to the fail status of path PE1-CE1, PE1 access the second entry of VRF2 table 221(2) for backup path forwarding information, and forwards the traffic to next hop PE2 (NH 2.2.2.2) as directed. Path PE2-CE1 is operating normally. Upon receiving the traffic for VRF2 forwarded by PE1, PE2 access the first entry of VRF2 table 222(2), which directs forwarding of traffic to CE1 directly.

Figure 5:
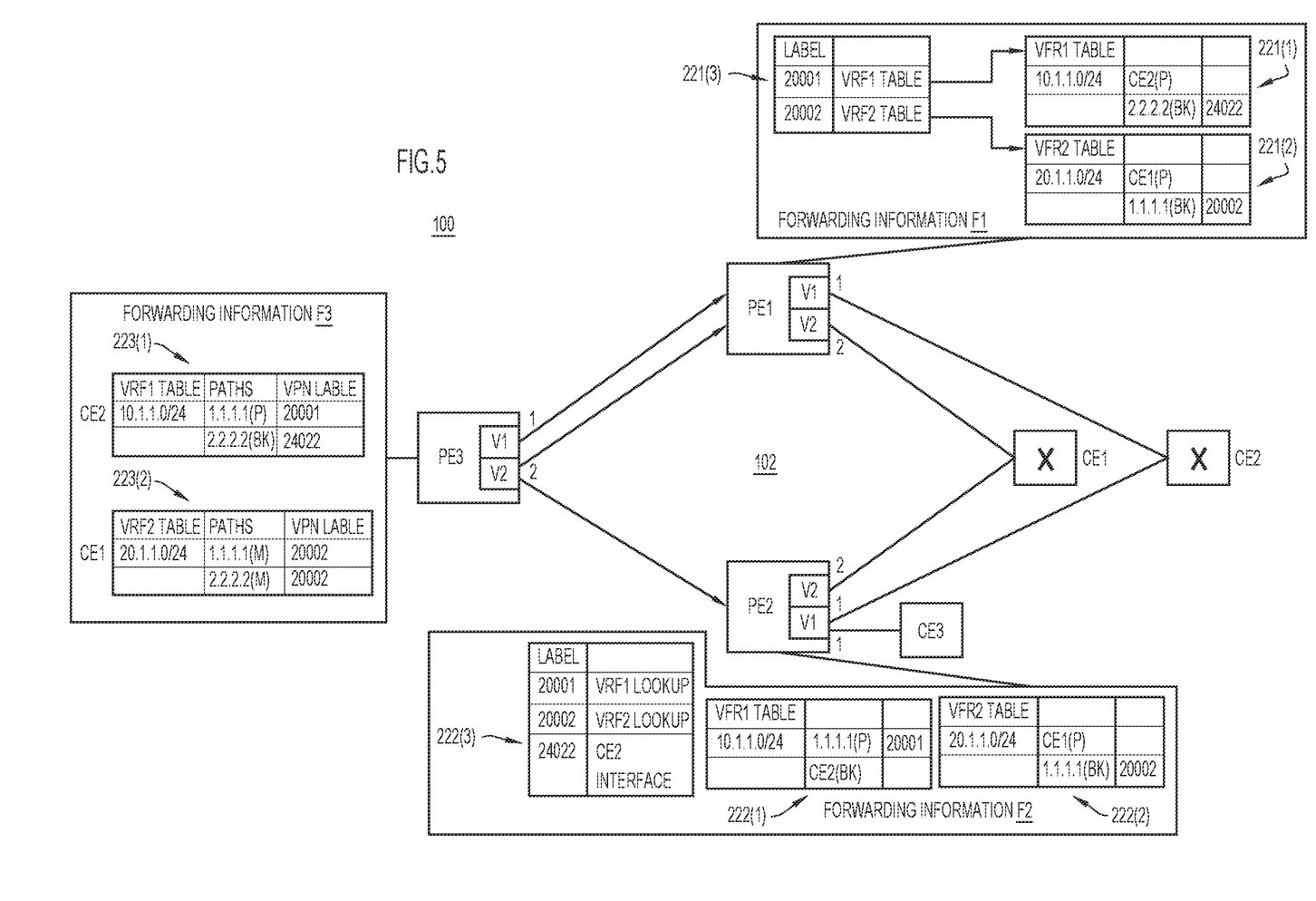
FIG. 5 is an illustration of undesired behaviors that can occur in the core network when the core network is configured with the hybrid VRF VPN labels of FIGS. 3 and 4, according to an example embodiment.

With reference to FIG. 5, there is an illustration of undesired behaviors that can occur in core network 100 under CE failure modes when the core network is configured with the hybrid VRF labels of FIG. 3 (and FIG. 4). A first undesired behavior occurs with per-VRF label forwarding for the ECMP scenario in VRF2 when CE1 fails (as indicated by the "X" superimposed on CE1 in FIG. 5). When CE1 fails, traffic for VRF2 loops between PE1 and PE2 until BGP converges for VRF2. This is because PE1 and PE2 each performs respective VRF lookups, and then use respective backup paths towards each other as directed. In contrast, VRF1 operates normally as PE2 receives traffic for VRF1 with the per-CE label, and the traffic is dropped.

A second undesired behavior occurs with the per-CE label advertisement for best-external operation. In this case, PE3 receives/downloads from RR 110 a best external path as backup, but does not have any ECMP FEC entry. Then, when the preferred path for PE1 path is withdrawn, the path for PE2 becomes the best path, but does not have an associated per-VRF label (because only the per-CE label was advertised). This causes PE2 to send a new update with a per-VRF label, to maintain steady-state behavior. It is desirable to avoid this churn.

As described below in connection with FIG. 6, the following solution avoids both of the above-described undesired behaviors:
 a. Along with a per-VRF label, allocate a per-CE label for the best (i.e., primary)/best external path on egress PEs (e.g., PE1, PE2).
 b. Advertise the per-CE label as a backup VRF label in a new BGP backup label extended community (advertisement), and program the backup path on the ingress PE (e.g., PE3) or on the dual-homing peer egress PEs (PE1, PE2).

Figure 6:
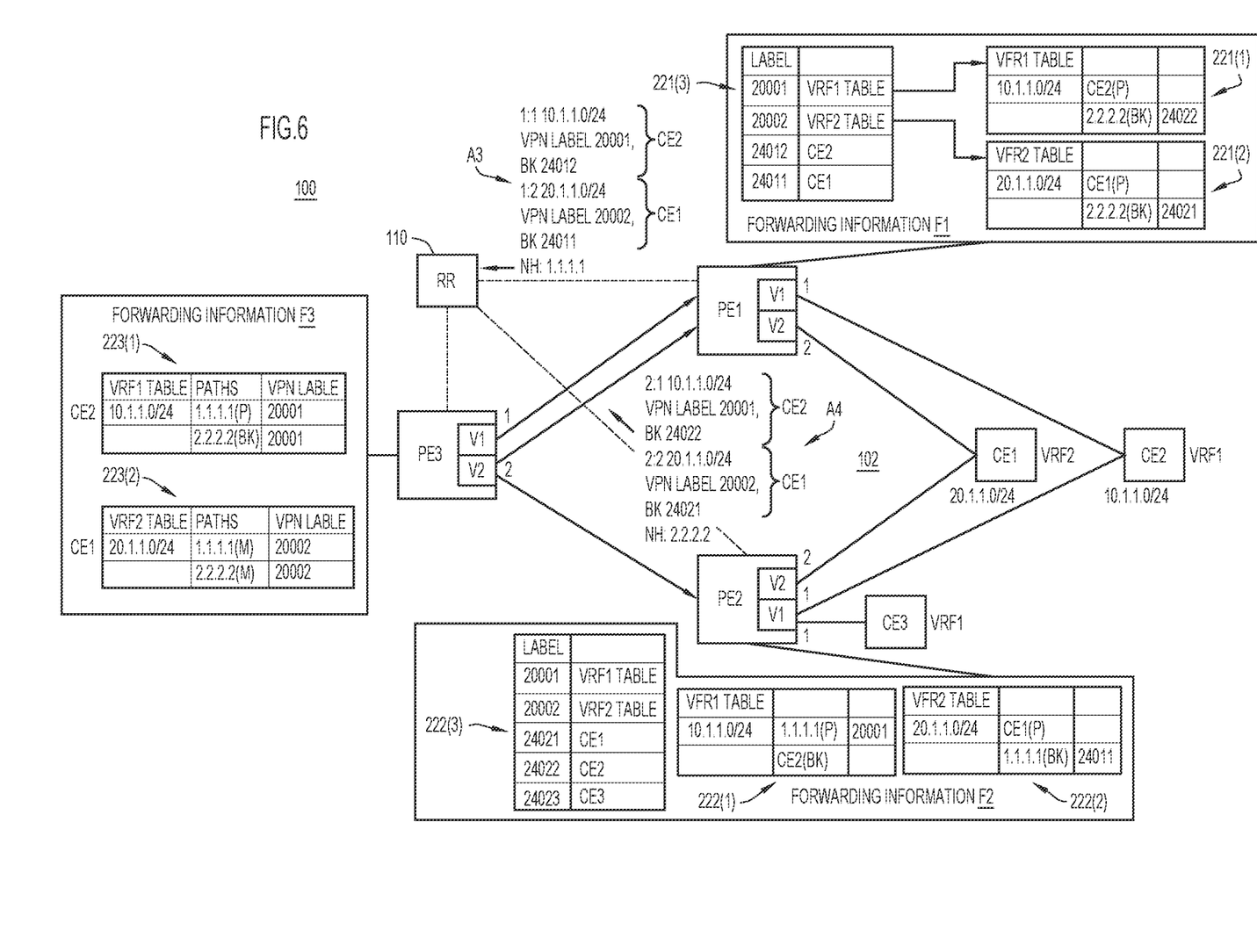
FIG. 6 is an illustration of the traffic forwarding information and control plane advertisements from PE nodes that avoid the undesired behaviors shown in FIG. 5, according to an example embodiment.

With reference to FIG. 6, there is an illustration of an example method/forwarding information configuration implemented on core network 102 that solves the above-described CE failure mode. In the example of FIG. 6, PE1 allocates per-VRF labels 20001 and 20002 for VRF1 and VRF2, respectively, as discussed above. PE1 also allocates a respective per-CE label as a backup label for all CEs about which PE1 learned a best path or a best external path. For example, PE 1 allocates the following per-CE backup labels along with corresponding per-VRF labels:
 a. For CE2, VRF1 label 20001, allocate per-CE label 24012 as backup label.
 b. For CE1, VRF2 label 20002, allocate per-CE label 24011 as backup label.

Similarly, PE2 allocates the following per-CE backup labels along with corresponding per-VRF labels:
 a. For CE2, VRF1 label 20001, allocate per-CE label 24022 as backup label (this was described above, in part, in connection with FIG. 3).
 b. For CE1, VRF2 label 20002, allocate per-CE label 24021 as backup label.

After the above-described backup per-CE label allocations, PE1 sends to RR 110 an advertisement A3 to advertise the per-VRF labels together with their associated per-CE labels that are backup labels, and indications (e.g., flags) that the per-CE labels are backup labels. PE1 may advertise the per-VRF labels in existing VPN label space, e.g., in Layer-3 VPN (L3VPN) Subsequent Address Family Identifiers (SAFI) Network Layer Reachability Information (NLRI). PE1 may advertise the best path per-CE label or the best external path per-CE label as a backup label in a new BGP backup label attribute, as shown in FIG. 6. Similarly, PE2 sends to RR 110 an advertisement A4 to advertise the per-VRF labels with their corresponding per-CE labels as backup, and indications that the per-CE labels are backup labels.

The method shown in FIG. 6 avoids loops in failure cases based on advertisements A3 and A4 and the resulting programming that occurs in core network 102. The method also supports both the ECMP case with optimal FEC entry sharing, as well as the best-external/backup case.

Figure 7:
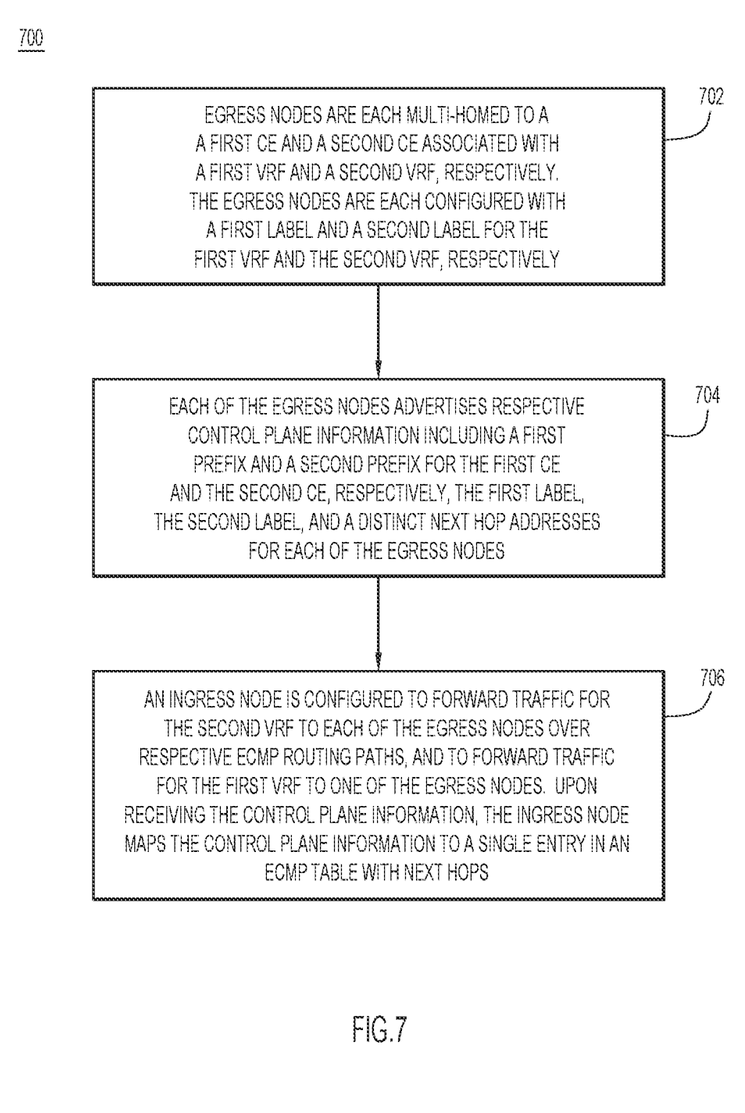
FIG. 7 is a flowchart of a method of assigning per-VRF VPN labels at multi-homed egress PE nodes, and constructing a reduced-size ECMP FEC table for multiple multi-homed prefixes for multiple VRFs, according to an example embodiment.

With reference to FIG. 7, there is a flowchart of an example method 700 of (i) assigning per-VRF labels at multi-homed egress PEs, and (ii) constructing a reduced-size ECMP FEC table that uses only a single entry for multiple multi-homed prefixes and next hops for multiple VRFs. Method 700 may be performed by egress nodes including a first egress node (e.g., PE1) and a second egress node (e.g., PE2) each multi-homed to a first CE (e.g., CE2) and a second CE (e.g., CE1) that belong to a first VRF (e.g., VRF1) and a second VRF (e.g., VRF2), respectively. Method 700 also involves an egress node (e.g., PE3) configured to forward traffic for the second VRF to each of the egress node over respective ECMP paths, and to forward traffic for the first VRF to one of the first and second egress nodes. The method includes the following operations.

At 702, a first per-VRF label and a second per-VRF label for the first VRF and the second VRF, respectively, are configured on each of the first and second egress nodes respectively.

At 704, the first and second egress nodes each advertises respective control plane information (e.g., sends a respective BGP advertisement) including a first prefix and a second prefix for the first CE and the second CE, respectively, the first per-VRF label, the second per-VRF label, and a distinct next hop addresses for each of the first and second egress nodes.

At 706, upon receiving the control plane information advertised by the first and second egress nodes, the ingress node populates a first VRF table (e.g., 223(1)) for forwarding traffic for the first VRF with first information including a first prefix and the first per-VRF label, and populates a second VRF table (e.g., 223(2)) for forwarding ECMP traffic for the second VRF with second information including a second prefix and the second per-VRF label. Also, using a mapping construct (e.g., construct 240), the ingress node maps the first prefix, the second prefix, the first per-VRF label, and the second per-VRF label to a single entry in an ECMP table (e.g., an ECMP FEC table entry) that lists the distinct next hop addresses for traffic carrying the first per-VRF label and traffic carrying the second per-VRF label (e.g., 1.1.1.1 for the first egress node, and 2.2.2.2 for the second egress node).

Figure 8:
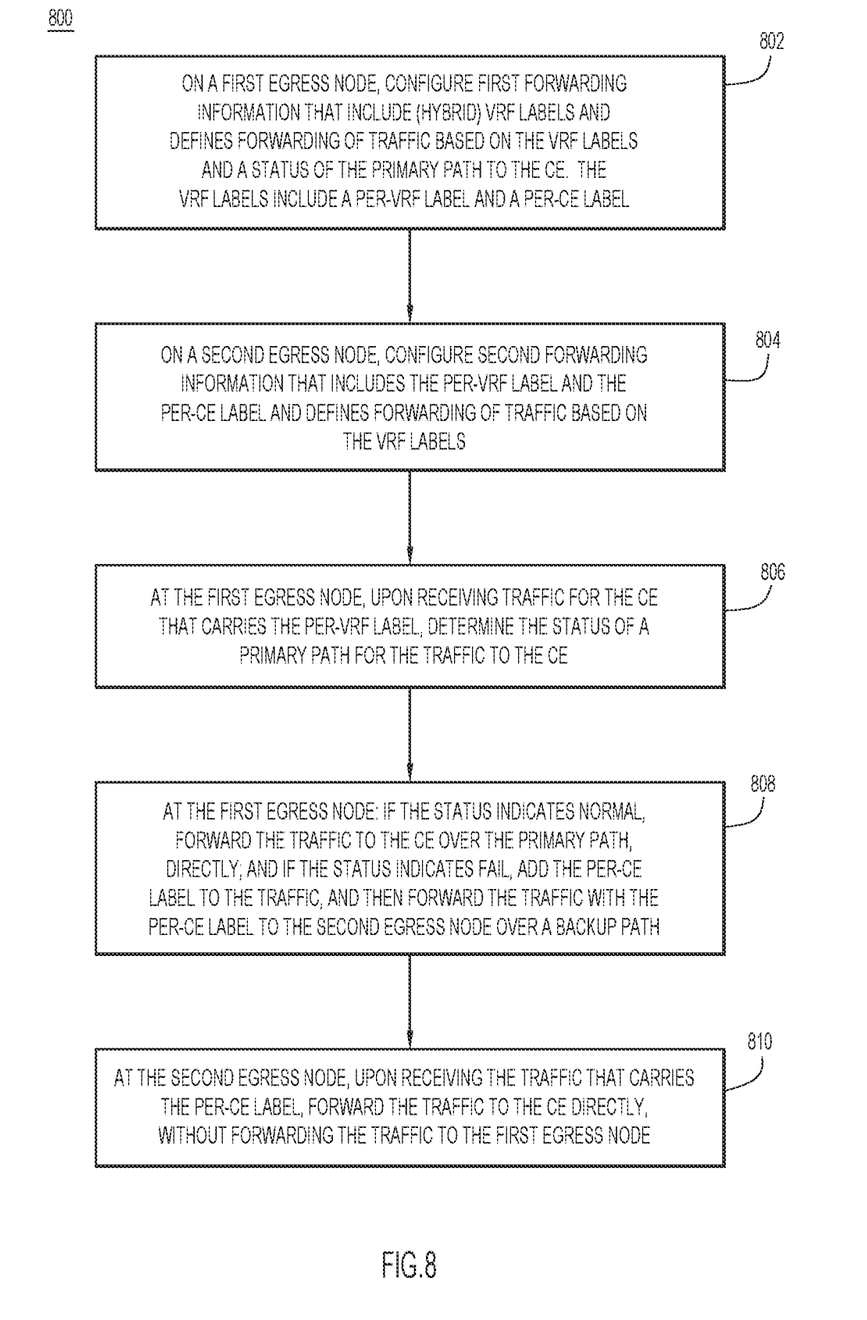
FIG. 8 is a flowchart of a method of using hybrid VRF VPN labels, including per-VRF VPN and per-CE labels, in the core network, according to an example embodiment.

With reference to FIG. 8, there is a flowchart of an example method 800 of using hybrid VRF labels, including per-VRF and per-CE labels, in a core network. Method 800 may be performed by a first egress node (e.g., PE1) and a second egress node (e.g., PE2) each multi-homed to a CE (e.g., CE2) that participates in a VRF (e.g., VRF1). The first egress node has a primary path (e.g., PE1-CE2) to the CE that is preferred over any other path to the CE.

At 802, configure first forwarding information (e.g., F1) on the first egress node. The first information includes hybrid VRF labels and defines forwarding of traffic based on the VRF labels and a status of the primary path to the CE. The hybrid VRF labels include a per-VRF label for the VRF and a per-CE label for the CE. For example, the first forwarding information may include a VRF table (e.g., VRF1 table 221(1) indexed by the per-VRF label), the VRF table including a primary (path) entry that directs forwarding of traffic to the primary path (e.g., PE1-CE2) when the status is normal, and a backup entry that includes the per-CE label (e.g., 24022) and directs forwarding of traffic to the backup path (e.g., NH 2.2.2.2) when the status is fail.

At 804, configure second forwarding information (e.g., F2) on the second egress node. The second information includes the hybrid VRF labels (i.e., the per-VRF label and the per-CE label) and defines forwarding of traffic based on the hybrid VRF labels. For example, the second forwarding information includes a VRF table (e.g., VRF1 table 222(1)) that includes a primary entry that directs forwarding of traffic to the first egress node, and a backup entry that includes directs forwarding of traffic to the CE, directly.

At 806, at the first egress node, upon receiving traffic for the CE that carries the per-VRF label, determine a status of the primary path.

At 808, at the first egress node, depending on the status, either forward the traffic to the CE directly, or forward the traffic to the second egress node with the per-CE label. More specifically: if the status indicates normal, forward the traffic to the CE over the primary path, directly (e.g., locally/using a cross-connect, and without forwarding the traffic to another PE); and if the status indicates fail, add the per-CE label to the traffic, and then forward the traffic to the second egress node over a backup path.

At 810, at the second egress node, upon receiving the traffic that carries the per-CE label, the second egress node forwards the traffic to the CE directly, without forwarding the traffic to the first egress node.

Figure 9:
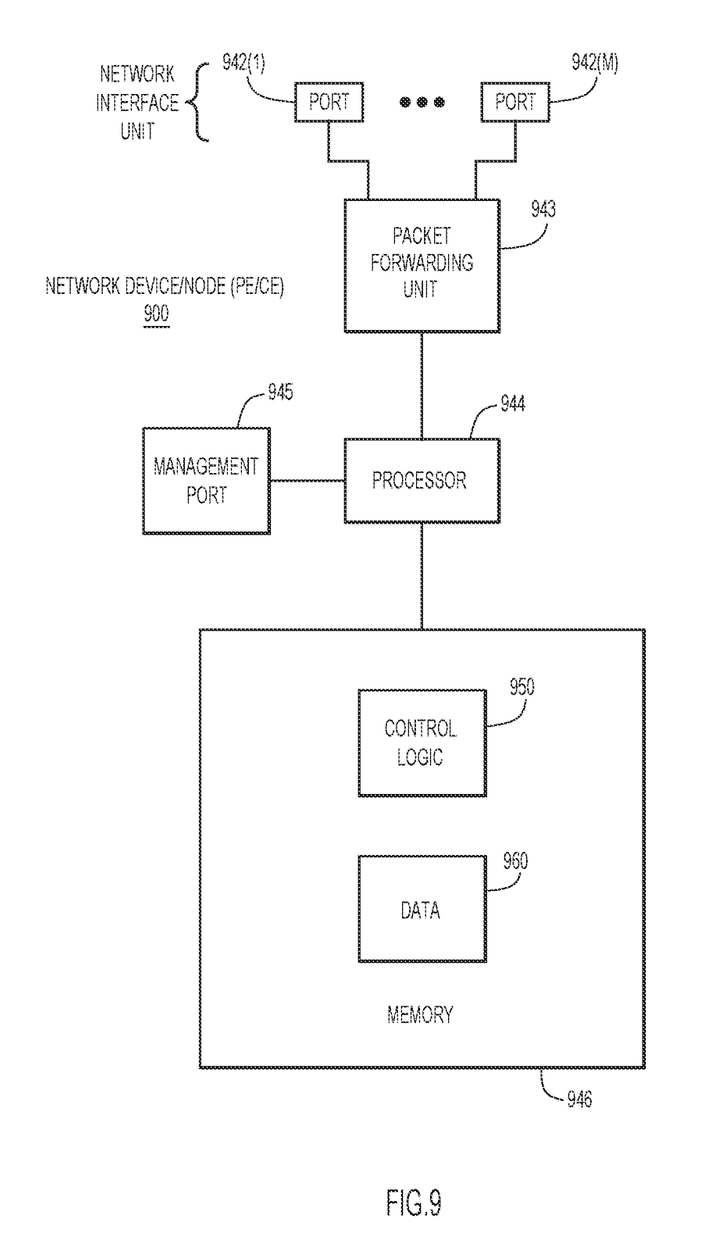
FIG. 9 is a block diagram of a network device representative of the PE nodes, according to an example embodiment.

With reference to FIG. 9, there is a block diagram of an example network device 900, representative of each of PE1-PE3. Network device 900 may be a router or a switch. Network device 900 comprises a network interface unit having a plurality of network input/output (I/O) ports 942(1)-942(M) to send traffic (e.g., IP packets) to a network and receive traffic (e.g., IP packets) from the network, a packet forwarding/processing unit 943, a network processor 944 (also referred to simply as "processor"), a management port 945 to exchange control messages with other network devices and an administration function, and a memory 946. The packet forwarding/processing unit 943 is, for example, one or more ASICs that include packet buffers, packet queues, and other control logic for performing packet forwarding operations. The processor 944 is a microcontroller or microprocessor that is configured to perform higher level controls of network device 900. To this end, the memory 946 stores software instructions that, when executed by the processor 944, cause the processor 944 to perform a variety of operations including operations described herein. For example, the memory 946 stores instructions for control logic 950 to perform operations described herein, including instantiating VRFs, and forwarding of traffic for the VRFs. Control logic 950 may also include logic components in packet forwarding unit 943. Memory 946 also stores data 960 used and generated by logic 950. Such data may include traffic forwarding information, path status, packets, and so on, as described above.

In summary, the embodiments presented herein:
  a. Provide BGP services with ECMP on platforms with limited ECMP FEC entries.
  b. Provide active-backup (BGP best external) and ECMP with per-VRF label to avoid any undesired traffic forwarding loops. For example, the embodiments provide BGP prefix-independent convergence for both active-active (A-A) (ECMP) and active-standby (A-S) (best external) scenarios with per-VRF label allocation, without causing any transient traffic loops.
  c. May be applied generally to VPN service with many (e.g., hundreds and thousands of) PEs).
  d. Are not dependent on underlay anycast forwarding to PEs.

The embodiment presented in connection with FIG. 2 overcomes problems created by conventional techniques in which conventional labels are allocated from platform label space and are independently allocated by an egress PE. In this case, when a CE is dual-homed to two egress PEs, each of the egress PEs may allocate an independent label on learning a prefix for the CE, and then each of the egress PEs advertises the label to the remote ingress PE. The ingress PE downloads each prefix with an ECMP set (next hop, outgoing label). Since there was no coordination in label allocation on next hops, each prefix from the same set of next hops may use different labels and consume hardware ECMP FEC entries. The ECMP FEC table, which is typically very limited in terms of storage space, can be exhausted very quickly. The embodiment of FIG. 2 coordinates allocation of per-VRF labels, and condenses prefix information into a single FEC entry.

In summary, in one aspect, a method is provided comprising: at a first egress node and a second egress node each multi-homed to a customer edge (CE) that participates in virtual routing and forwarding (VRF), the first egress node having a primary path to the customer edge that is preferred over any other path to the customer edge: on the first egress node, configuring first forwarding information that includes VRF labels and defines forwarding of traffic based on the VRF labels and a status of the primary path to the customer edge, the VRF labels including a per-VRF label for the VRF and a per-CE label for the customer edge; on the second egress node, configuring second forwarding information that includes the per-VRF label and the per-CE label and defines forwarding of traffic based on the VRF labels; and at the first egress node, upon receiving traffic for the customer edge that carries the per-VRF label: determining the status of the primary path; and depending on the status, either forwarding the traffic to the customer edge over the primary path or forwarding the traffic to the second egress node over a backup path.

In another aspect, a system is provided comprising: a first egress node and a second egress node each multi-homed to a customer edge (CE) that participates in virtual routing and forwarding (VRF), the first egress node having a primary path to the customer edge that is preferred over any other path to the customer edge; the first egress node configured with first forwarding information that includes VRF labels and defines forwarding of traffic based on the VRF labels and a status of the primary path to the customer edge, the VRF labels including a per-VRF label for the VRF and a per-CE label for the customer edge; the second egress node configured with second forwarding information that includes the per-VRF label and the per-CE label and defines forwarding of traffic based on the VRF labels; and the first egress node configured to perform, upon receiving traffic for the customer edge that carries the per-VRF label: determining the status of the primary path; and depending on the status, either forwarding the traffic to the customer edge over the primary path or forwarding the traffic to the second egress node over a backup path.

In another aspect, a method is provided comprising: at egress nodes each multi-homed to a first customer edge (CE) and a second customer edge associated with first virtual routing and forwarding (VRF) and second VRF, respectively: configuring on each of the egress nodes a first label and a second label for the first VRF and the second VRF, respectively; and at each of the egress nodes, advertising control plane information including a first prefix and a second prefix for the first customer edge and the second customer edge, respectively, the first label, the second label, and a distinct next hop addresses for each of the egress nodes; and at an ingress node configured to forward traffic for the second VRF to each of the egress nodes over respective equal-cost multi-path (ECMP) routing paths, and to forward traffic for the first VRF to one of the egress nodes, upon receiving the control plane information, mapping the first prefix, the second prefix, the first label and the second label to a single entry in an ECMP table that lists the distinct next hop addresses for traffic carrying the first label and traffic carrying the second label.

In yet another aspect, a system is provided comprising: egress nodes each multi-homed to a first customer edge (CE) and a second customer edge associated with first virtual routing and forwarding (VRF) and second VRF, respectively, wherein each of the egress nodes is configured with a first label and a second label for the first VRF and the second VRF, respectively, and wherein each of the egress nodes is configured to perform advertising control plane information including a first prefix and a second prefix for the first customer edge and the second customer edge, respectively, the first label, the second label, and a distinct next hop addresses for each of the egress nodes; and an ingress node to forward traffic for the second VRF to each of the egress nodes over respective equal-cost multi-path (ECMP) routing paths, and to forward traffic for the first VRF to one of the egress nodes, the ingress node configured to perform, upon receiving the control plane information, mapping the first prefix, the second prefix, the first label and the second label to a single entry in an ECMP table that lists the distinct next hop addresses for traffic carrying the first label and traffic carrying the second label.

In yet other aspects, non-transitory computer readable storage media encoded with instructions are provided. The instructions, when executed by processors of egress nodes each multi-homed to a first customer edge and a second customer edge associated with first virtual routing and forwarding (VRF) and second VRF, respectively, and a processor of an ingress node to forward traffic for the VRFs to each of the egress nodes over respective equal-cost multi-path (ECMP) routing paths, cause the processors to perform the methods/operations described above.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a first egress node and a second egress node each multi-homed to a customer edge (CE) that participates in virtual routing and forwarding (VRF), the first egress node having a primary path to the customer edge that is preferred over any other path to the customer edge:
on the first egress node, configuring first forwarding information that includes VRF labels and defines forwarding of traffic based on the VRF labels and a status of the primary path to the customer edge, the VRF labels including a per-VRF label for the VRF and a per-CE label for the customer edge;
on the second egress node, configuring second forwarding information that includes the per-VRF label and the per-CE label and defines forwarding of traffic based on the VRF labels; and
at the first egress node, upon receiving traffic for the customer edge that carries the per-VRF label:
determining the status of the primary path; and depending on the status, either forwarding the traffic to the customer edge over the primary path or forwarding the traffic to the second egress node over a backup path.

2. The method of claim 1, further comprising, at the first egress node:
if the status indicates fail, adding the per-CE label to the traffic and performing the forwarding by forwarding the traffic with the per-CE label to the second egress node over the backup path.

3. The method of claim 2, further comprising, at the first egress node:
if the status indicates normal, forwarding the traffic to the customer edge directly, without forwarding the traffic to the second egress node.

4. The method of claim 1, wherein:
the configuring the first forwarding information includes configuring the first forwarding information to include a VRF table indexed by the per-VRF label, the VRF table including a primary entry that directs forwarding of traffic to the primary path when the status is normal, and a backup entry that includes the per-CE label and directs forwarding of traffic to the backup path when the status is fail.

5. The method of claim 1, wherein:
the configuring the second forwarding information includes configuring the second forwarding information with a VRF action table that includes the per-CE label and an action associated with the per-CE label to direct forwarding of traffic with the per-CE label to the customer edge, directly.

6. The method of claim 5, wherein:
the configuring the second forwarding information further includes configuring the VRF action table to further include the per-VRF label that indexes a VRF table, the VRF table including a primary entry that directs forwarding of traffic to the first egress node, and a backup entry that includes directs forwarding of traffic to the customer edge, directly.

7. The method of claim 1, further comprising:
at each of the first and second egress nodes, advertising control plane information including a prefix for the customer edge, the per-VRF label, and the per-CE label with an indication that the per-CE label is a backup VRF label; and
at an ingress node configured to forward traffic destined for the customer edge to the first egress node, upon receiving the control plane information, populating a VRF table for forwarding the traffic destined for the customer edge based on the control plane information.

8. The method of claim 7, wherein the populating the VRF table on the ingress node includes:
populating a primary entry of the VRF table with a next hop address for the first egress node and the per-VRF label; and
populating a backup entry of the VRF table with a next hop address for the second egress node and the per-CE label.

9. A system comprising:
a first egress node and a second egress node each multi-homed to a customer edge (CE) that participates in virtual routing and forwarding (VRF), the first egress node having a primary path to the customer edge that is preferred over any other path to the customer edge;
the first egress node configured with first forwarding information that includes VRF labels and defines forwarding of traffic based on the VRF labels and a status of the primary path to the customer edge, the VRF labels including a per-VRF label for the VRF and a per-CE label for the customer edge;
the second egress node configured with second forwarding information that includes the per-VRF label and the per-CE label and defines forwarding of traffic based on the VRF labels; and
the first egress node configured to perform, upon receiving traffic for the customer edge that carries the per-VRF label:
determining the status of the primary path; and
depending on the status, either forwarding the traffic to the customer edge over the primary path or forwarding the traffic to the second egress node over a backup path.

10. The system of claim 9, wherein the first egress node is further configured to perform:
if the status indicates fail, adding the per-CE label to the traffic and performing the forwarding by forwarding the traffic with the per-CE label to the second egress node over the backup path.

11. The system of claim 10, wherein the first egress node is further configured to perform:
if the status indicates normal, forwarding the traffic to the customer edge directly, without forwarding the traffic to the second egress node.

12. The system of claim 9, wherein:
the first forwarding information includes a VRF table indexed by the per-VRF label, the VRF table including a primary entry that directs forwarding of traffic to the primary path when the status is normal, and a backup entry that includes the per-CE label and directs forwarding of traffic to the backup path when the status is fail.

13. The system of claim 9, wherein:
the second forwarding information includes a VRF action table that includes the per-CE label and an action associated with the per-CE label to direct forwarding of traffic with the per-CE label to the customer edge, directly.

14. The system of claim 13, wherein:
the VRF action table further includes the per-VRF label to index a VRF table, the VRF table including a primary entry that directs forwarding of traffic to the first egress node, and a backup entry that includes directs forwarding of traffic to the customer edge, directly.

15. A method comprising:
at egress nodes each multi-homed to a first customer edge (CE) and a second customer edge associated with first virtual routing and forwarding (VRF) and second VRF, respectively:
configuring on each of the egress nodes a first label and a second label for the first VRF and the second VRF, respectively; and
at each of the egress nodes, advertising control plane information including a first prefix and a second prefix for the first customer edge and the second customer edge, respectively, the first label, the second label, and a distinct next hop addresses for each of the egress nodes; and
at an ingress node configured to forward traffic for the second VRF to each of the egress nodes over respective equal-cost multi-path (ECMP) routing paths, and to forward traffic for the first VRF to one of the egress nodes, upon receiving the control plane information, mapping the first prefix, the second prefix, the first label and the second label to a single entry in an ECMP table that lists the distinct next hop addresses for traffic carrying the first label and traffic carrying the second label.

16. The method of claim 15, wherein the first label and the second label are each a respective per-VRF label.

17. The method of claim 15, further comprising, at the ingress node:
- populating a first VRF table for forwarding traffic for the first VRF with first information including a first prefix and the first label, populating a second VRF table for forwarding ECMP traffic for the second VRF with second information including a second prefix and the second label; and
- wherein the mapping includes mapping the first information in the first VRF table and the second information in the second VRF table to the single entry in the ECMP table.

18. The method of claim 15, wherein the advertising is performed using a Border Gateway Protocol (BGP), and the advertising includes:
- at each of egress nodes, sending a BGP advertisement including the first prefix, the second prefix, the first label, the second label, and a first next hop address for forwarding traffic from the ingress node to the egress nodes.

19. The method of claim 15, further comprising at each of the egress nodes:
- learning the first prefix and the second prefix associated with the first label and the second label, respectively.

20. The method of claim 15, wherein the single entry in the ECMP table is a single entry in an ECMP Forwarding Equivalency Class (FEC) table.

* * * * *